Feb. 7, 1967  J. R. HUGHES ETAL  3,303,243
PROCESS FOR PRODUCING HEAT-RECOVERABLE ARTICLES
Filed Feb. 18, 1963  2 Sheets-Sheet 1

JOHN R. HUGHES
RICHARD W. MUCHMORE
INVENTORS

BY
ATTORNEYS

Feb. 7, 1967 J. R. HUGHES ETAL 3,303,243
PROCESS FOR PRODUCING HEAT-RECOVERABLE ARTICLES
Filed Feb. 18, 1963 2 Sheets-Sheet 2
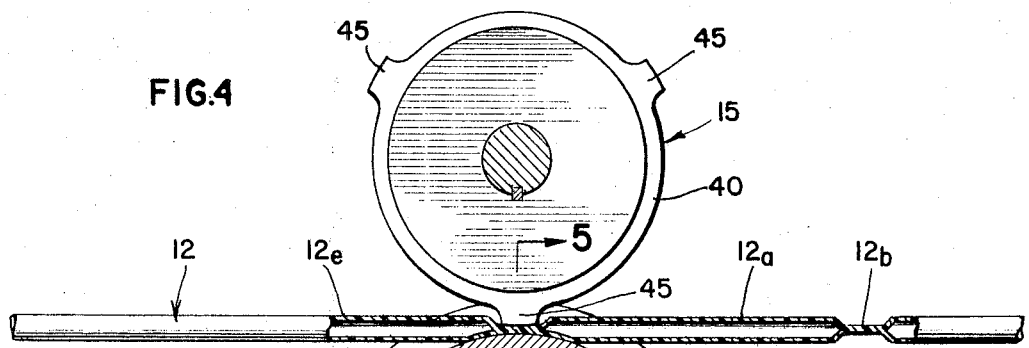
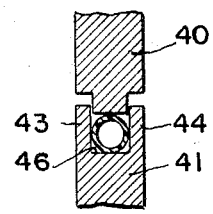
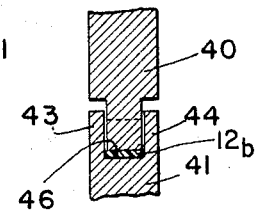
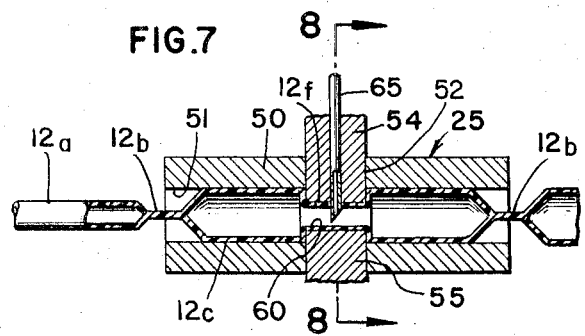
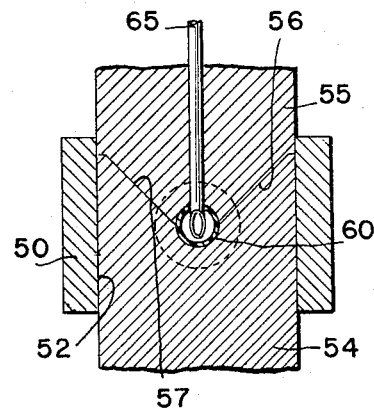
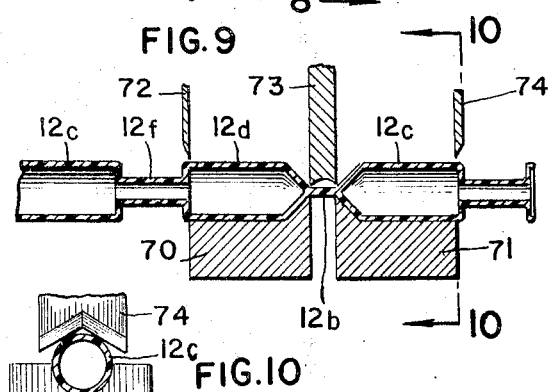
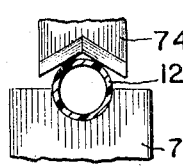
JOHN R. HUGHES
RICHARD W. MUCHMORE
INVENTORS
BY *Lyon+Lyon*
ATTORNEYS

United States Patent Office 3,303,243
Patented Feb. 7, 1967

3,303,243
PROCESS FOR PRODUCING HEAT-RECOVERABLE ARTICLES
John R. Hughes, Palo Alto, and Richard W. Muchmore, Redwood City, Calif., assignors to Raychem Corporation, Redwood City, Calif., a corporation of California
Filed Feb. 18, 1963, Ser. No. 259,018
17 Claims. (Cl. 264—22)

This invention relates to the production of heat-recoverable articles and has particular reference to a process and apparatus for producing heat-shrinkable plastic articles in tubular form, but sealed at one end.

Heat-shrinkable articles, comprising plastic tubing sealed at one end and having the property of elastic memory (sometimes referred to as plastic memory), have found extensive use as so-called "end caps" for encapuslating cable and wire terminations, splices and the like. These caps are provided in varying lengths and diameters, but are dimensionally oversized with respect to the object to be encapsulated for easy application to the object, followed by the application of heat to shrink the cap tightly about the object. A primary object of the present invention is to provide an improved process for the mass production of such articles.

A further object of the present invention is to provide a continuous process for the production of heat-shrinkable plastic end caps.

Other objects and advantages of the present invention it is believed will be readily apparent from the following detailed description of preferred embodiments thereof, when read in connection with the accompanying drawings.

In the drawings:

FIGURE 4 is a fragmentary side view, partly in section, illustrating the sealing step and apparatus.

FIGURE 5 is a sectional view taken substantially on the line 5—5 of FIGURE 4.

FIGURE 6 is a sectional view similar to FIGURE 5, but illustrating the position of the parts immediately prior to application of the sealing pressure.

FIGURE 7 is a vertical axial section illustrating the expansion step and apparatus.

FIGURE 8 is a sectional view taken substantially on the line 8—8 of FIGURE 7.

FIGURE 9 is a vertical axial section illustrating the trimming or cutting step and apparatus.

FIGURE 10 is a sectional view taken substantially on the line 10—10 of FIGURE 9.

Figure 1:
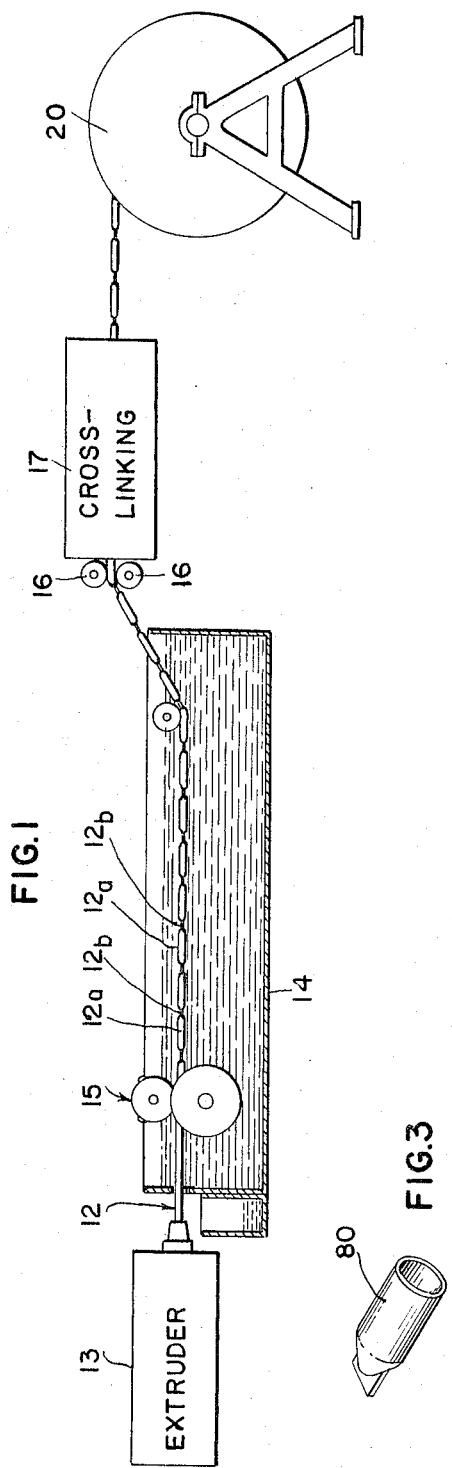
FIGURE 1 is a diagrammatic side view, partly in section, illustrating the initial steps utilized in carrying out a preferred embodiment of the process of the present invention.

The process of the present invention is particularly applicable to the production of heat-shrinkable end caps formed from thermoplastic materials comprising or containing polymers or co-polymers capable of being cross-linked by chemical methods or by irradiation as by high energy electrons or ionizing radiation, such materials including polyolefins such as polyethylene and polypropylene, vinyls such as polyvinyl chloride and polyvinyl acetate and co-polymers thereof, polyamides, etc.

In carrying out the preferred process of the present invention, the following steps are performed in the order set forth:

(1) The thermoplastic material is extruded or otherwise formed into a tube of the desired diameter and gauge.

(2) The tubing is collapsed at spaced intervals while at least the inside wall of the tubing is at a temperature above the thermoplastic temperature of the material, so as to form a heat-seal in the collapsed areas and produing a continuous length of the thermoplastic material, generally in tubular form, but the tubing wall being sealed to itself at the spaced intervals. While this operation may be accomplished upon the extruded or otherwise formed tubing after it has been cooled below the thermoplastic temperature, as by a re-heating, followed by the collapsing or pinching operation, preferably the collapsing operation is carried out while the tubing is still in the heated condition, immediately following the extrusion or other forming operation. Most advtanegously, the tubing is collapsed at the spaced intervals at a point close to the extrpsion die, but after the outer portion of the tubing wall has been cooled below the thermoplastic temperature and while the inner portion of the tubing wall is still above the thermoplastic temperature, so that ready fusion of the inner wall portion at the spaced intervals is easily accomplished by the application of a pinching force to the tubing at the desired spaced intervals. Thus, homogeneous seals are formed of the tubing material itself at the spaced intervals, without the use of adhesives or other bonding agents. At this point, the tubing could be cut to form the desired pre-expanded form of the end caps, but preferably the tubing is maintained in the continuous length form for carrying out the remainder of the process on a continuous basis.

(3) The polymeric material of the sequentially-sealed tubing is now cross-linked, by means of irradiation at a dose sufficient to achieve the degree of cross-linking desired, or by chemical cross-linking, the latter as by the inclusion of a chemical cross-linking agent (such as a peroxide in the case of polyolefins) in the initial polymeric material, designed to initiate cross-linking upon the controlled application of heat at this stage of the process, in a manner readily understood by those skilled in the art. As is well known, upon cross-linking, the polymeric material will not melt when heated above the crystalline melting temperature or thermoplastic temperature thereof, but will behave as an elastomer, being capable of stretching or distorting in a rubber-like manner. Thus, as is well known, such materials are eminently suited for the production of eastic memory articles, simply by cooling the material to a temperature below the crystalline melting temperature while it is held in the stretched or distorted condition. When so cooled, the material will retain the distorted configuration until it is re-heated above the crystalline melting temperature, whereupon it will return to its original configuration unless mechanically restrained.

(4) The cross-linked, sequentially-sealed tubing is now heated to a temperature above the crystalline melting temperature and the tubing portions are then expanded to the desired final diameter. This expansion is most advantageously carried out by the creation of a differential in pressure between the inside and outside of the tubing portions, preferably by injection of a gas such as compressed air into the interior of the tubing portions, under sufficient pressure to bring about the desired expansion. Other specific means of expansion would include the reduction in pressure on the outside of the tubing, the injection of a liquid under pressure into the interior of the tubing portions, the initial placing into the extruded tubing or injection into the tubing portions of a chemical or chemicals capable of generating a gas or vapor upon the application of the heat to the tubing, etc. If desired, the cross-linked, sequentially-sealed tubing can be cut into the pre-expanded end caps and the expansion carried on after such cutting operation, such as by forcing a mandrel or pin into the open end of the cap while hot and removing the mandrel or pin after cooling to a temperature sufficient to set the cap in the expanded condition. The expansion is not essentially dependent upon the application of heat to a temperature above the crystalline melting temperature, as expansion can be carried out at lower temperatures or even room temperature if the force of expansion is sufficient and if the material is held in the expanded condition for a sufficient length of time.

(5) While the tubing portions are held in the expanded condition, the material is cooled to a temperature sufficient to set the material in the expanded form. Preferably, the tubing is expanded within the confines of a cylinder of heat-conductive material and is immediately cooled upon contact with the cylinder so that the expanded diameter is regulated within reasonably close tolerances.

(6) If the preferred process is carried out, the material is now in the form of a continuous length of cross-linked, sequentially-sealed tubing, the tubing portions being expanded beyond the diameter prior to cross-linking, and the last step is to cut or trim the length into the individual end cap articles.

Referring now to the drawings, the initial steps in the preferred process are illustrated in FIGURE 1, wherein the thermoplastic material is extruded in the form of a tube 12 from the extruder 13 and passed into a cooling tank 14. Positioned within the tank at a point at which the interior wall of the tubing is still in the melt, but at which the exterior wall of the tubing has been cooled below the thermoplastic temperature, is a sealing assembly 15, described more fully below, which pinches the walls of the tubing together at spaced intervals and causes them to be fused together, forming a plurality of tubular portions 12a, spaced apart by sealed portions 12b. The sequentially-sealed tubing is drawn out of the cooling tank by means of driving rollers 16 and fed through the cross-linking chamber 17, preferably therein exposed to a high energy radiation source such as a high energy electron beam (not shown). The irradiation is carried out in a manner known to those skilled in the art, to insure even irradiation on all sides, as well as the correct amount of irradiation to provide the desired level of cross-linking. The cross-linked, sequentially-sealed tubing is wound on the storage reel 20, although if desired, the tubing can be continuously fed to the remainder of the process illustrated in FIGURE 2.

Figure 2:
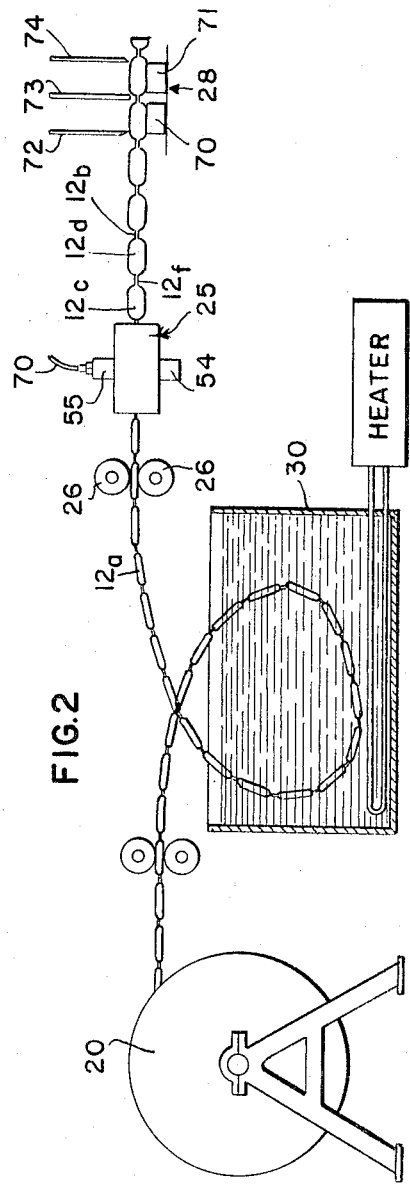
FIGURE 2 is a diagrammatic side view, partly in section, illustrating the final steps used in carrying out said process.

As shown in FIGURE 2, the tubing is fed into a heating tank 30, containing a bath of glycerine or the like heated to a temperature above the crystalline melting temperature of the tubing material, i.e. in the range 300°–400° F., with materials such as cross-linked polyethylene. The tubing, now in the heated, elastomeric condition, is intermittently fed into the expansion assembly 25 by means of the intermittent drive rollers 26, and the tubing portions 12a are expanded into expanded portions 12c and 12d, following which the length of expanded tubing is cut into the desired end cap products at the cutting station 28.

Referring now to FIGURES 4–6, the sealing assembly 15 is shown therein and comprises a pair of driven roller members 40 and 41. The roller 41 is provided with a pair of flanges 43 and 44, spaced apart and providing a groove only slightly wider than the outside diameter of the tubing 12. The roller member 40 is provided with a plurality of projecting members or lobes 45 slightly narrower than the spacing between the flanges 43 and 45 and adapted to be projected therebetween, the radial spacing between the periphery of the lobes 45 and the peripheral surface 46 of the roller 41 being less than twice the thickness of the tubing wall 12e, when in the projected position as shown in FIGURE 5. Thus, it will be understood that with each revolution of the roller member 40, the three lobes 45 successively enter the space between the flanges 43 and 45 and therein pinch or compress the tubing 12 to fully collapse the same and to form the sealed portions 12b.

The expansion assembly is illustrated in FIGURES 7 and 8, and it comprises a cooling die 50 having a cylindrical bore 51 and provided with a central vertical opening 52 in which is received for vertical reciprocation, by means not shown, a pair of block members 54 and 55. The members 54 and 55 are provided with mating, generally V-shaped end portions 56 and 57, the apex areas thereof being arcuate to form a completed cylinder 60 of smaller diameter than the diameter of the cylindrical bore 51. Extending vertically downwardly through the member 54 is a hollow needle or cannula 65, the lower, sharpened end of which depends below the central lower surface of the member 54. The upper end of the needle 65 is secured to an air hose 70 leading from a source (not shown) of compressed air.

As indicated above, the cross-linked, sequentially-sealed tubing is intermittently fed to the assembly 25 by means of the rollers 26, and as indicated in FIGURES 7 and 8, one of the portions 12a is positioned centrally within the cooling die 50 (while the members 54 and 55 are in the retracted position, not shown), and then the members 54 and 55 are extended to the position shown in FIGURES 7 and 8, during which movement the needle 65 pierces the tubing wall. The tubular portion 12a is then expanded, by means of the injection of the compressed air through the needle 65, forming the expanded tubular portions 12c and 12d. Upon contacting the relatively cool cylindrical bore 51, the temperature of the material forming the wall of the tubular members quickly decreases below the crystalline melting temperature thereof, and the tubing portions become set in the expanded condition, leaving the tube wall portion 12f in the unexpanded condition as shown. The members 54 and 55 are then retracted and the tubing is advanced to bring a new portion 12a into the die for expansion thereof, and this cycle is continuously repeated.

Figure 3:
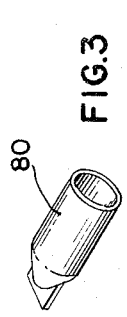
FIGURE 3 is a perspective view of an end cap article produced in accordance with the present invention.

The cutter assembly 28 is shown in FIGURES 9 and 10 and comprises a pair of stationary block members 70 and 71 provided with upper, arcuate surfaces shaped to conform to the contour of the lower parts of the portions 12c and 12d, and vertically reciprocable knife members 72, 73 and 74, the members 72 and 74 being provided with V-shaped single cutting edges, and the member 73 being provided with V-shaped double edges. It will thus be understood that by a single, simultaneous stroke of the three knife members, the portions of the tubing positioned as shown in FIGURE 9 will be cut into two completed end caps 80, one of which is shown in FIGURE 3.

Although not shown in the drawings, it will be understood that suitable drive means are provided for intermittently feeding the tubing to the cutting assembly 28.

The present invention is further illustrated by the following example. A composition made up of the following ingredients on a percent by weight basis was prepared:

Polyethylene (Hercules Powder Hifax 1400-E) _____ 64
Antimony oxide _____ 19
Chlorowax (Manufactured by Diamond Alkali Co.)_ 16
4,4'-thiobis(6-t-butyl-m-cresol) _____ 1

This composition was extruded as a tube having an inside diameter of 0.044 inch and a wall thickness of 0.025 inch at an extrusion speed of 210 ft. per minute. The extrusion temperature of the composition was 380° F. As illustrated in FIGURE 1, the extruded tube was then passed into a bath having a temperature of 60° F. The bath was positioned 2" from the extrusion dye and pinch rolls 15 were positioned an additional six inches away from the dye. The bath was thirty feet long and pinched tube 12 was at approximately bath temperature when it emerged from the bath.

The tube was then irradiated at a dose of 30 megarads with high energy electrons generated by a 1 mev. electron beam generator.

As illustrated in FIGURE 2, the pinched tube was then heated in a glycerin bath at 325° F. bath for 15 seconds and expanded by air injection as illustrated in FIGURE 7 by pressurizing at 40 p.s.i. to produce an expanded outside diameter of 0.155 inch and an expanded inside diameter of 0.135 inch. The expanded tube was then cooled to a temperature such that it retained its expanded dimensions and then cut at the heat sealed portion. The resulting product was a highly satisfactory heat recoverable article having one open end and one closed end.

Having fully described the present invention, it is to be understood that it is not to be limited to the details set forth, but is of the full scope of the appended claims.

We claim:

1. In a process for the production of heat-shrinkable end caps, the steps of forming a tube of a thermoplastic polymeric material, heat-sealing spaced wall portions of the tube to form a plurality of isolated tubular portions having an initial diameter, cross-linking the polymeric material of said tubular portions, heating the tubular portions to a temperature above the crystalline melting point, expanding by the creation of a differential pressure between the inside and outside of the tubing, and cooling said tubular portions while holding them in the expanded condition to produce heat-shrinkable tubular portions having a final diameter greater than said initial diameter.

2. The process of claim 1, wherein said heat-sealing step is carried out while the inside wall portions of the tube are heated to a temperature above the thermoplastic temperature thereof.

3. The process of claim 1, wherein said tube is formed by extruding a heated mass of said material, and wherein said heat-sealing step is carried out by pinching the tube wall portions together while said tube is still in the heated, fusable condition.

4. The process of claim 3, wherein prior to the pinching step the outside wall of the tube is cooled to a temperature below the thermoplastic temperature of said material.

5. The process of claim 1, wherein said expanding step is carried out by injection of a gas under pressure to the interior of said tubular portions.

6. The process of claim 1, wherein said material is polyethylene and wherein said cross-linking is carried out by high energy irradiation.

7. The process of claim 1, wherein said cross-linking is carried out by chemical means.

8. In a process for the production of heat-shrinkable end caps, the steps of extruding a heated mass of thermoplastic polymeric material, heat-sealing spaced wall portions of the tube to form a plurality of isolated tubular portions having an initial diameter, exposing the tubular portions to electron irradiation under conditions to cross-link said polymeric material, heating said tubular portions to a temperature above the crystalline melting temperature of said polymeric material, expanding the heated tubular portions to a final diameter greater than said initial diameter, and cooling said tubular portions while holding them in the expanded condition.

9. The process of claim 8, wherein said polymeric material is polyethylene.

10. The process of claim 8, wherein said expanding and cooling steps are carried out by intermittently moving said heated tubular portions into a cylindrical cooling die having a diameter equal to said final diameter, and injecting air under pressure into said tubular portions while in said die to force the tubular portions into contact with said die.

11. The process of claim 10, wherein said injection is carried out by piercing a portion of said tubular portion.

12. The process of claim 8, wherein said heat-sealing step is carried out by first cooling the outer wall of the tube as it comes from the extruding step, and pinching spaced tube wall portions together while it is still in the heated, fusable condition.

13. The process of claim 12, wherein said polymeric material is polyethylene.

14. The process of claim 12, wherein said expanding and cooling steps are carried out by intermittently moving said heated tubular portions into a cylindrical cooling die having a diameter equal to said final diameter, and injecting air under pressure into said tubular portions while in said die to force the tubular portions into contact with said die.

15. The process of claim 1, wherein said process is carried out upon a continuous length of tubing, and wherein the expanded tubular portions are cut to provide the finished end caps.

16. The process of claim 8, wherein said process is carried out upon a continuous length of tubing, and wherein the expanded tubular portions are cut to provide the finished end caps.

17. The process of claim 14, wherein said process is carried out upon a continuous length of tubing, and wherein the expanded tubular portions are cut to provide the finished end caps.

References Cited by the Examiner

UNITED STATES PATENTS

| | | | |
|---|---|---|---|
| 2,579,390 | 12/1951 | Mills | 264—99 |
| 2,904,480 | 9/1957 | Rainer | 264—22 |
| 2,972,780 | 2/1961 | Boonstra | 264—329 |
| 3,035,302 | 5/1962 | Lysobey | 264—99 |
| 3,111,711 | 11/1963 | Colombo | 18—5 |
| 3,146,491 | 9/1964 | Eyquem | 8—5 |
| 3,165,563 | 1/1965 | Rasmussen | 264—22 |
| 3,170,966 | 2/1965 | Kemeny | 264—22 |

ROBERT F. WHITE, *Primary Examiner.*

R. B. MOFFITT, *Assistant Examiner.*